United States Patent
Forbes et al.

(12) 
(10) Patent No.: US 6,400,861 B1
(45) Date of Patent: Jun. 4, 2002

(54) OPTICAL DEMULTIPLEXER ARCHITECTURE

(75) Inventors: Duncan J Forbes, Bishop's Stortford; Robert Spagnoletti, Hertford; Nigel Baker, Harlow, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/559,854

(22) Filed: Apr. 27, 2000

(51) Int. Cl.$^7$ ............................................... H04J 14/02
(52) U.S. Cl. ............................ 385/24; 385/39; 385/43; 385/15; 359/127; 359/124
(58) Field of Search ............................ 385/24, 39, 43, 385/15; 359/127, 124

(56) References Cited

U.S. PATENT DOCUMENTS

| | | | | |
|---|---|---|---|---|
| 5,809,190 A | * | 9/1998 | Chen | 385/43 |
| 6,160,932 A | * | 12/2000 | Huang et al. | 385/24 |
| 6,208,444 B1 | * | 3/2001 | Wong et al. | 359/127 |
| 6,256,433 B1 | * | 7/2001 | Luo et al. | 385/24 |
| 6,285,478 B1 | * | 9/2001 | Liu et al. | 359/127 |
| 2001/0024543 A1 | * | 9/2001 | Ahmadvand et al. | 385/24 |

* cited by examiner

*Primary Examiner*—Cassandra Spyrou
*Assistant Examiner*—Fayez Asaf
(74) *Attorney, Agent, or Firm*—Lee, Mann, Smith, McWilliams, Sweeney & Ohlson

(57) ABSTRACT

Wave division multiplexers and demultiplexers utilizing fused fiber couplers and similar devices are expensive to implement. This is a barrier to deployment of optical networks particularly in the metro and access areas. The invention provides a cheaper design scheme to help overcome this problem. The invention provides an apparatus arranged to demultiplex a predetermined range and number of wavelengths comprising a plurality of devices each having at least one input port and two output ports, the output ports of each device having a periodic and complimentary series of minimum attenuation wavelength peaks, wherein the devices are arranged such that each demultiplexes a unique series of wavelengths, and wherein the apparatus comprises at least one device having a series of minimum attenuation wavelength peaks which do not correspond to the unique series of wavelengths the device is arranged to demultiplex.

18 Claims, 10 Drawing Sheets

OPTICAL DEMULTIPLEXER ARCHITECTURE

FIELD OF THE INVENTION

The present invention relates to optical filter architectures, and in particular to multiplexer and demultiplexer architectures for wave division multiplex optical signals.

BACKGROUND OF THE INVENTION

Wave division multiplexed optical networks can utilise fused fibre coupler based wavelength multiplexers and demultiplexers. A fused fibre coupler 1 is shown in FIG. 1a, and as is known this has complementary sinusoidal frequency responses at its two output ports as shown in FIG. 1b. In the example shown in FIG. 1, channels or bands having wavelengths λ1, λ2, λ3, and λ4 entering the fused coupler input port X are split on exiting the fused coupler 1 between its output ports Y and Z. The frequency response corresponding to port Y is shown in solid line in FIG. 1b and it can be seen that attenuation is at a minimum at wavelengths λ1 and λ3, and at a maximum at wavelengths λ2 and λ4. Channels corresponding to wavelengths λ1 and λ3 are therefore passed out at port Y while channels corresponding to wavelengths λ2 and λ4 are not passed. The frequency response through port Z is shown in dashed line in FIG. 1b and is such that only channels corresponding to wavelengths λ2 and λ4 pass out of port Z. Fused fibre couplers and equivalent devices are used as sinusoidal filters. Fused fibre couplers are symmetrical as is known such that wavelengths fed into the Y port for example, can be split between the W and X ports in the same way that wavelengths through port X can be split between the Y and Z ports as described above.

FIG. 2 shows a typical fused coupler based wavelength demultiplexer structure 10 utilising a number of fused coupler elements or sinusoidal filters 11a–o arranged in a tree and branch structure or architecture. These arrangements rely on a series of channels having equally spaced wavelengths. In the example shown, a 16 channel demultiplexer comprises 15 fused coupler filter elements 11a–o arranged in a tree and branch structure. Each fused coupler filter element 11a–o is designed to pass half the channels entering its X port to its Y port, and the other half of the incoming channels to its Z port. The fused couplers filter elements 11a–o are arranged to have a pass band (ie minimum attenuation) corresponding to the lowest of the channel wavelengths entering their input ports (X). As discussed above in connection with FIG. 1, the filter elements 11a–o are arranged to split the incoming wavelengths or channels between their two output ports Y and Z. The sinusoidal frequency response of the filters 11a–o are arranged such that they may pass more than one of the wavelengths of the channel series. This is described in more detail with reference to FIG. 3 below which shows the demultiplexing stages of channel 1 by the filter series F, which comprises filter elements 11a, 11b, 11c and 11d.

FIG. 3a shows the frequency response of fused coupler or filter element 11a. It can be seen that at the Y port, minimum attenuation is centred about wavelengths corresponding to channels 1, 3, 5, 7, 9, 11, 13, 15. These channels are then passed to the input port X of filter element 11b which has a sinusoidal frequency response shown in FIG. 3b and has a period double that of filter element 11a. It can be seen therefore that of the channels passed to input port X of filter 11b, channels 1, 5, 9, 13 are passed to output port Y of filter 11b. These channels are then fed to the input port X of filter element 11c, the frequency response of which is shown in FIG. 3c. Filter element 11c has a period double that of filter 11b, and hence quadruple that of filter 11a. It can be seen from FIG. 3c that only channels 1 and 9 will be passed to output port Y of filter element 11c. These are then fed to the input port X of filter element 11d which has a period 8 times that of filter element 11a, and its frequency response is shown in FIG. 3d. As can be seen, only channel 1 will be passed to output port Y of filter element 11d. It can be appreciated therefore that all channels 1–16 can be demultiplexed through various filter element series (e.g. F) as shown in FIGS. 2 and 3. Similarly, multiplexers can be constructed by a similar process as is known.

A major disadvantage with this type of demultiplexer is the high cost of fabrication. This is particularly significant in the deployment of wave division multiplex optical networks in the metro and access arenas.

SUMMARY OF THE INVENTION

It is an object of the present invention to provide an improved or at least alternative demultiplexer for use in wave division multiplexed optical networks.

In this specification the words multiplexer and demultiplexer are used interchangeably.

In a first aspect the present invention provides an apparatus or structure arranged to filter a predetermined range and number of wavelengths comprising:

a tree and branch filter architecture having a plurality of filters, each having a frequency response such that said filter passes a first set of wavelengths to a first output port and a second set of wavelengths to a second output port;

wherein at least two filters have the same frequency responses, and wherein each of said same frequency response filters are arranged to pass different wavelength sets.

Preferably said filters are sinusoidal filters.

Preferably said filters are fused fibre couplers.

Preferably said apparatus comprises a number (n) of filter stages and wherein each stage has filters with a maximum of two different frequency responses.

Preferably said minimum attenuated wavelengths of the two frequency responses are:

$$(T_1+T_2+ \ldots +T_n)/n \text{ and } (T_{n+1}+T_{n+2}+ \ldots +T_{2n})/n,$$

each having a period of $2^{(n-1)}T$.

In a second aspect the present invention provides a demultiplexer comprising:

a plurality of devices each having at least one input port and two output ports, the frequency responses of the output ports of each device being complimentary in wavelength;

wherein the devices are connected in a tree and branch architecture to demultiplex a predetermined range and number of wavelengths;

and wherein at least two of the devices have the same frequency responses.

Preferably the devices are fused fibre couplers.

Preferably the demultiplexer comprises a number of stages and wherein each stage has devices with a maximum of two different frequency responses.

In a third aspect the present invention provides an apparatus arranged to multiplex or demultiplex a predetermined range and number of wavelengths comprising:

a plurality of devices each having at least one input port and two output ports, the output ports of each device having a periodic and complimentary series of minimum attenuation wavelength peaks;

wherein the devices are arranged such that each multiplexes or demultiplexer a unique series of wavelengths;

and wherein the apparatus comprises at least one device having a series of minimum attenuation wavelength peaks which do not correspond to the unique series of wavelengths the device is arranged to multiplex or demultiplex.

Preferably the devices are fused fibre couplers.

Preferably the demultiplexer comprises a number of stages and each stage has devices with a maximum of two different frequency responses.

Preferably each device in the last stage is replaced with a bi-directional module to enable said apparatus to simultaneously multiplexes and demultiplexes said wavelengths.

Preferably each said module comprises a four port device having the same frequency response as the device in the first stage, and two devices having the same two responses as the replaced devices.

In a fourth aspect the present invention provides an optical network or network segment comprising an apparatus or structure arranged to filter a predetermined range and number of wavelengths comprising:

a tree and branch filter architecture having a plurality of filters, each having a frequency response such that said filter passes a first set of wavelengths to a first output port and a second set of wavelengths to a second output port;

wherein at least two filters have the same frequency responses, and wherein each of said same frequency response filters are arranged to pass different wavelength sets.

In a fifth aspect the present invention provides an apparatus arranged to simultaneously multiplex and demultiplex a predetermined range and number of wavelengths comprising:

a plurality of devices each having at least one input port and two output ports, the output ports of each device having a periodic and complimentary series of minimum attenuation wavelength peaks;

wherein the devices are arranged such that each multiplexes and demultiplexes a unique series of wavelengths;

and wherein the apparatus comprises at least one device having a series of minimum attenuation wavelength peaks which do not correspond to the unique series of wavelengths the device is arranged to demultiplex.

Preferably the devices are arranged into a tree and branch architecture having a first device comprising two input ports, said ports having a periodic and complimentary series of minimum attenuation wavelength peaks being symmetrical with said output port peaks; the apparatus arranged such that a signal to be demultiplexed is fed to one said input port and a multiplexed signal is fed from the other said input port.

Preferably the devices are fused fibre couplers.

Preferably the demultiplexer comprises a number of stages and wherein each stage has devices with a maximum of two different frequency responses.

BRIEF DESCRIPTION OF THE DRAWINGS

Preferred embodiments of the invention will now be described with reference to the following drawings, by way of example only and without intending to be limiting, in which:

FIG. 1b shows the frequency response of the fused fibre coupler of FIG. 1a;

DETAILED DESCRIPTION OF THE INVENTION

Figure 1A:
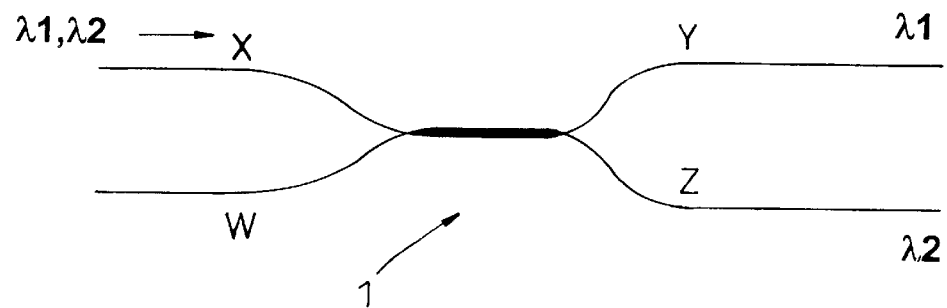
FIG. 1a shows a schematic of a fused fibre coupler.
Figure 1B:
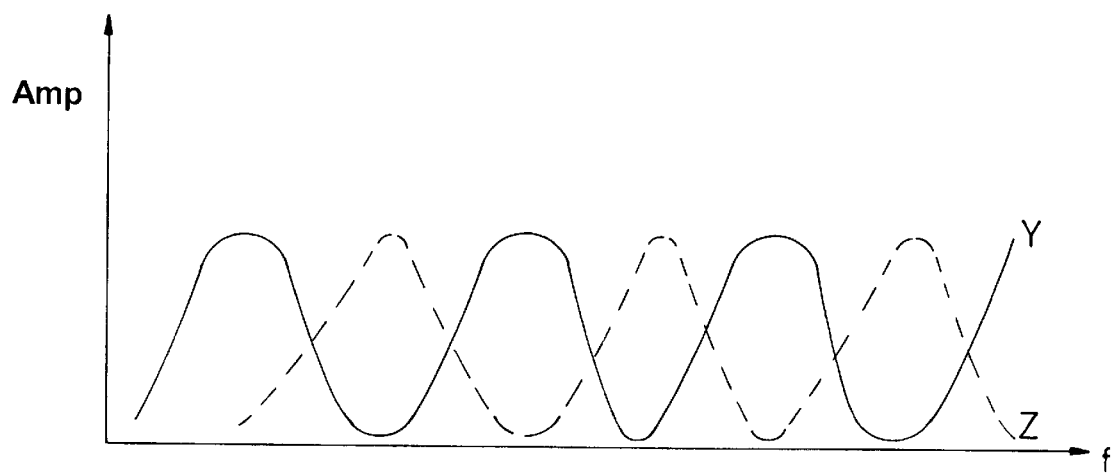
Figure 2:
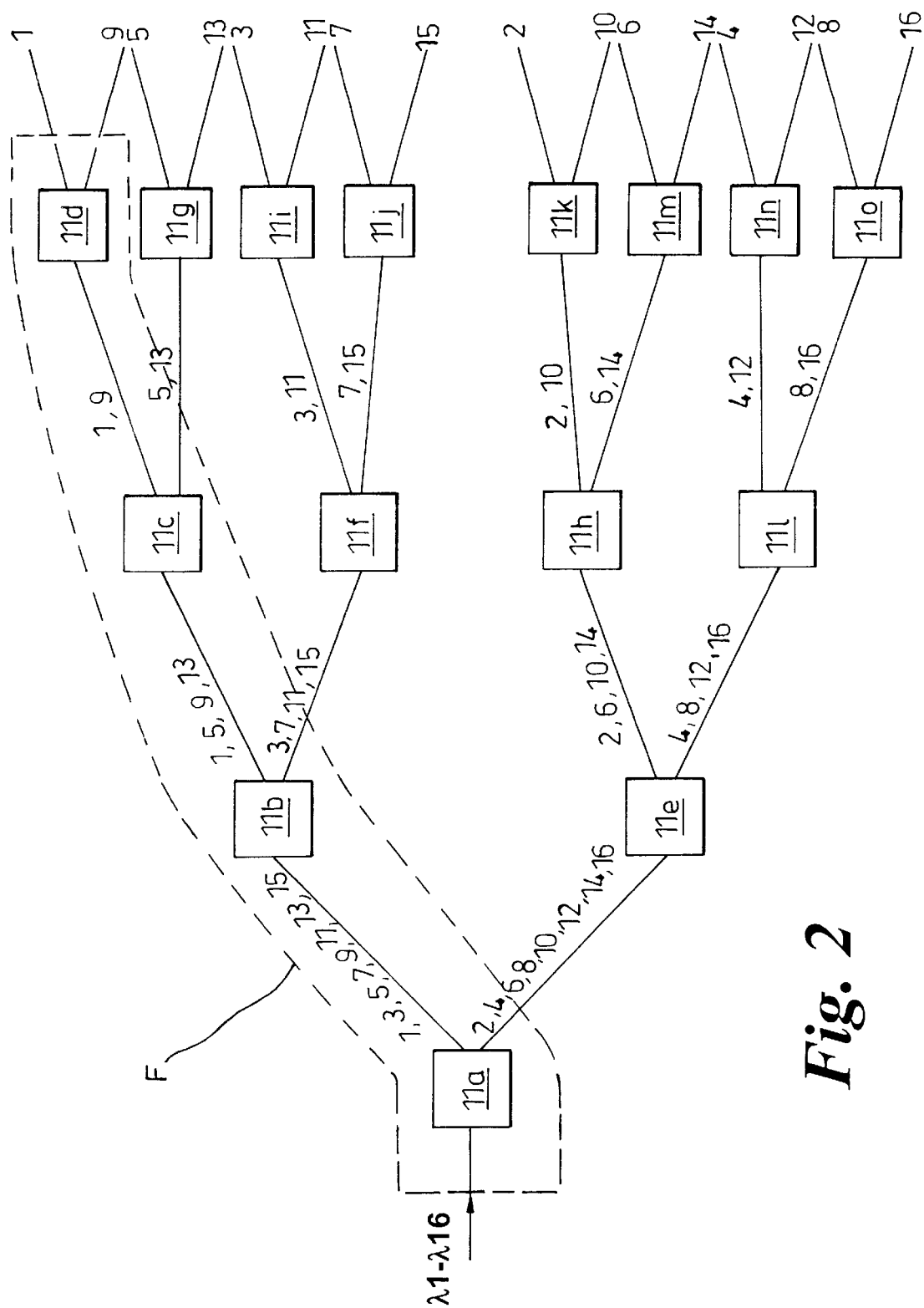
FIG. 2 shows a schematic of a demultiplexer comprising a tree and branch structure of fused fibre coupler filters.
Figure 3A:
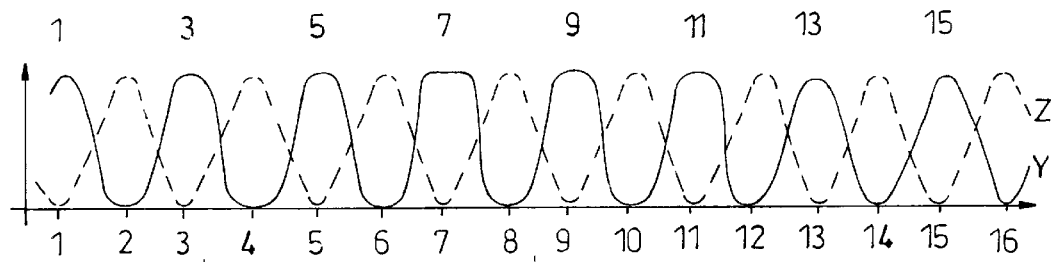
FIGS. 3a–d show the frequency responses of a channel series (F) of 4 filters within the multiplexer of FIG. 2.
Figure 3B:
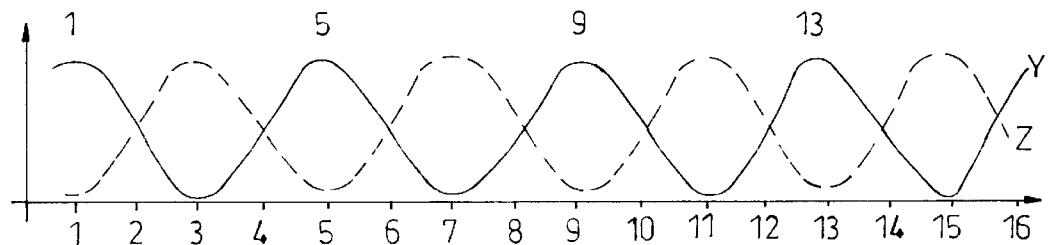
Figure 3C:
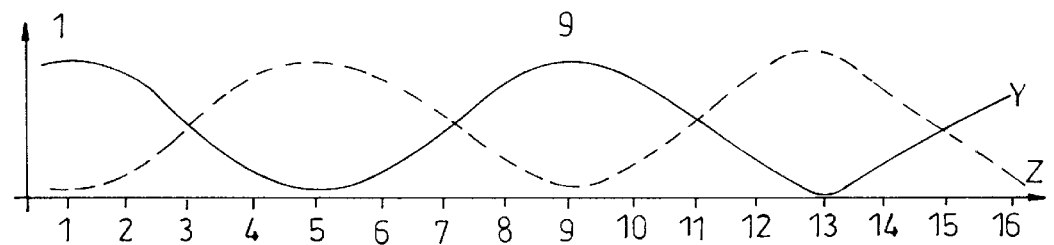
Figure 3D:
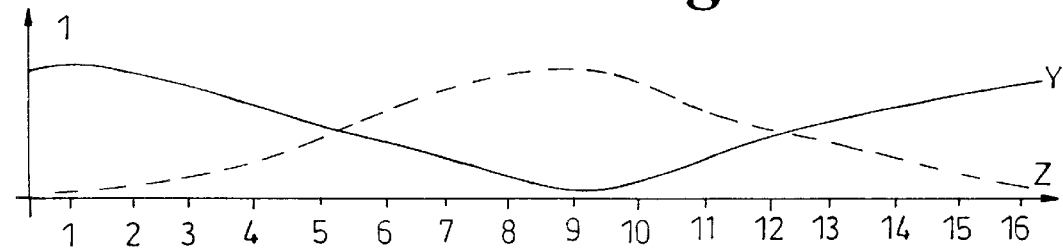
Figure 4:
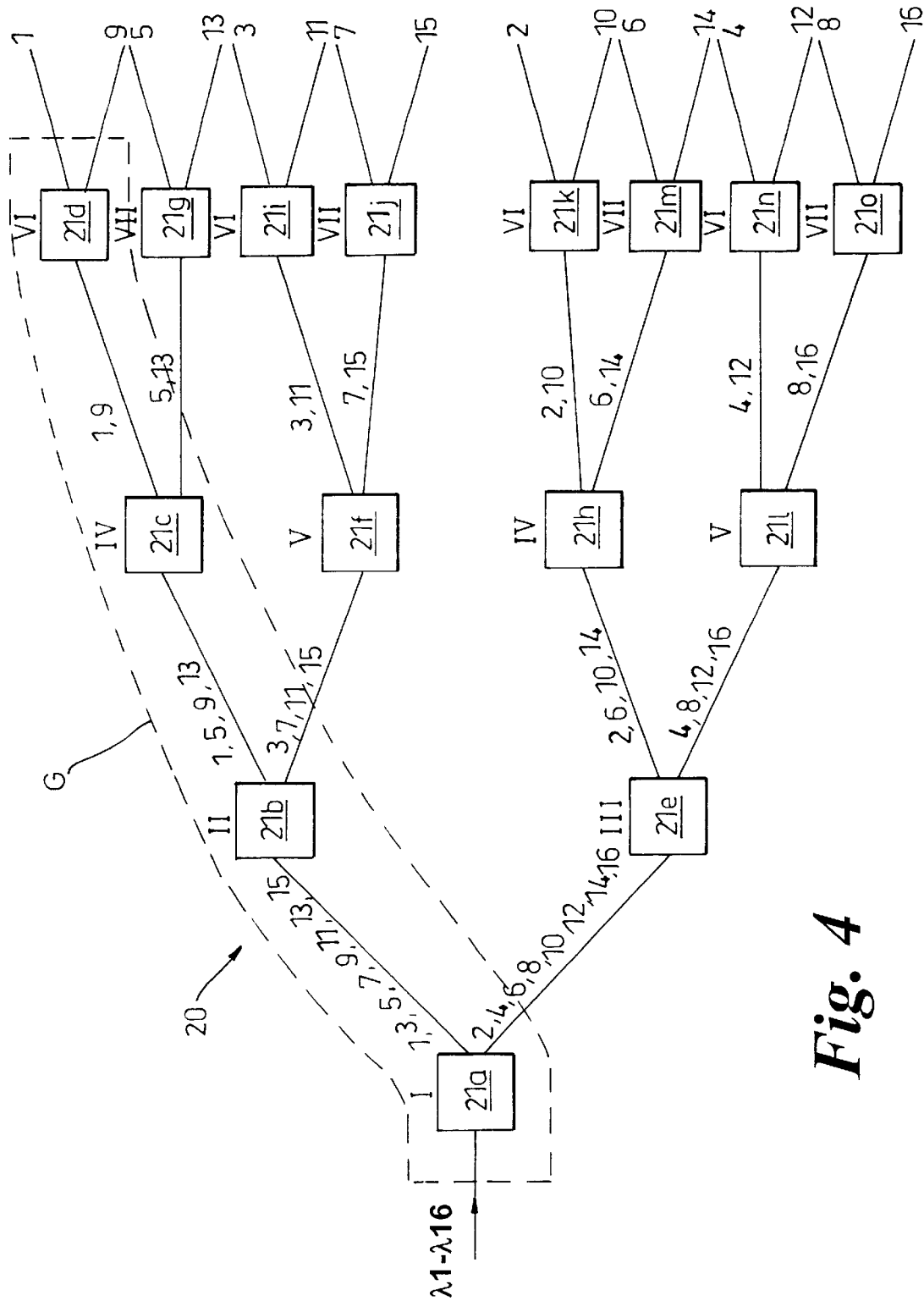
FIG. 4a demultiplexer architecture according to the present invention.

FIG. 4 shows a 16 channel demultiplexer comprising 15 fused coupler filter 5 elements 21a–o connected in a tree and branch structure as shown. The demultiplexer structure has 4 filter stages, each stage having no more than two filter designs (I, II, III, IV, V, VI, or VII). By careful re-optimised filter 21 design as described hereafter, it is possible to implement only two filter designs in the third, fourth and subsequent stages of the demultiplexer. By contrast, in the prior art, each filter element 11a–o requires a separate design dependant on its input port X channels and output port Y and Z channel split. In the prior art structure of FIG. 2, the third stage requires four different filter designs, and the fourth stage requires eight. That each filter element 11a–o has a unique design requirement has a significant cost implication on the multiplexer as a whole. The design of FIG. 4 is significantly cheaper to implement than the prior art design of FIG. 2 as there is a reduced component inventory and consequently a simpler manufacturing process. Because there are fewer filter designs to fabricate, the demultiplexer manufacturing process is more streamlined with less design steps, fewer fabrication operations, and reduced inventory considerations. This cost implication become more significant as the size of the demultiplexer is increased.

The table below shows the number of individual filter designs required for multiplexers of increasing channel capacity.

| Multiplexer size | Prior art filter design requirements | Filter design requirements using re-optimised approach |
| --- | --- | --- |
| 1 × 2 | 1 | 1 |
| 1 × 4 | 3 | 3 |
| 1 × 8 | 7 | 5 |
| 1 × 16 | 15 | 7 |
| 1 × 32 | 31 | 9 |
| 1 × 64 | 63 | 11 |

As can be seen from the above table, as the number of channels of a multiplexer/demultiplexer is increased, the difference in unique filter designs required between the prior art arrangement and that of the invention increases exponentially. There is therefore a corresponding improvement in multiplexing cost with the later approach. This will be advantageous in the deployment of WDM optical networks in the metro and access arenas.

In a wave division multiplex (WDM) system where the channels are equally spaced by Tnm and the wavelengths transmitted are $\lambda 1, \lambda 2, \lambda 3 \ldots$, the peak wavelengths of the filter elements 21a–o can be chosen such that only two filter designs (or peak wavelengths) are required for each filter stage of the multiplexer/demultiplexer. This is achieved by modifying or re-optimising the filter elements 21a–o such that their peak wavelengths do not correspond exactly with the lowest channel wavelength at their input port X.

FIGS. 5a–d show how the re-optimised filters of FIG. 4 operate to demultiplex a WDM signal, in a similar fashion to how FIG. 3 illustrates this with respect to the prior art. In particular, FIG. 5 shows the demultiplexing stages of channel 1 by the filter series G, which comprises filter 21a, 21b, 21c and 21d.

Figure 5A:
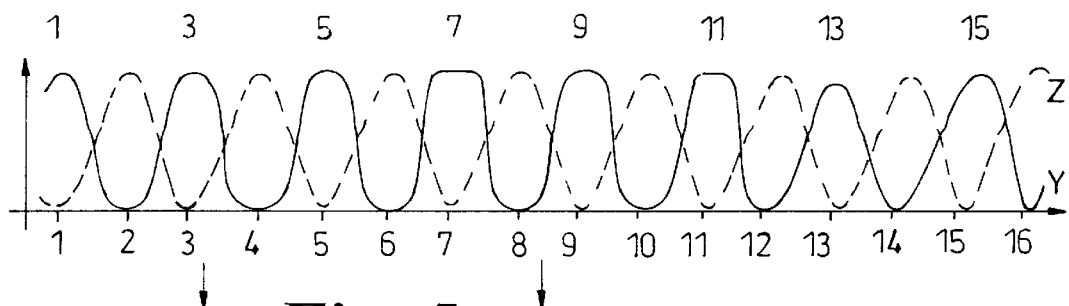
FIGS. 5a–d show the frequency responses of a channel series (G) of 4 filters within the demultiplexer of FIG. 4.
Figure 5B:
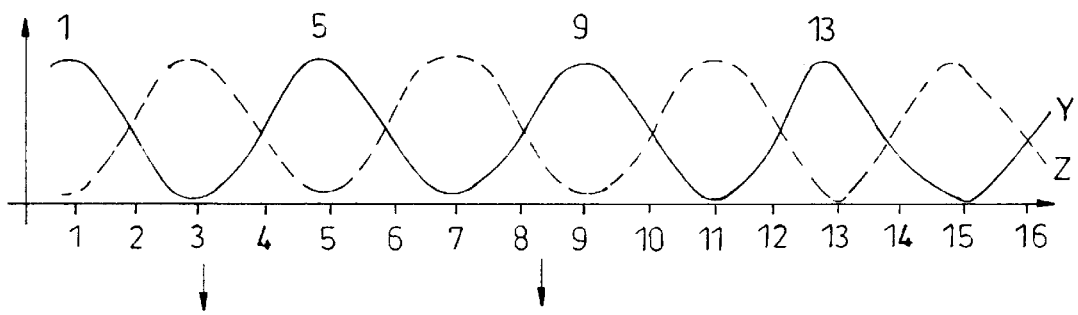

FIG. 5a shows the frequency response of fused coupler or filter element 21a. All 16 channel wavelength $\lambda 1$–$\lambda 16$ are fed into the input port X, and minimum attenuation is centred about wavelengths $\lambda 1, \lambda 3, \lambda 5, \lambda 7, \lambda 9, \lambda 11, \lambda 13$ and $\lambda 15$ corresponding to channels 1, 3, 5, 7, 9, 11, 13 and 15. These channels are passed to the output port Y which is coupled to the input port X of filter element 21b. The frequency response of filter element 21b is shown in FIG. 5b and has a sinusoidal frequency response having a period double that of filter element 21a. This results in the filtering of channels 3, 7, 11 and 15 to output port Y such that only channels 1, 5, 9 and 13 are passed to the input port X of filter element 21c which is coupled to the output port Y of filter 21b.

Figure 5C:
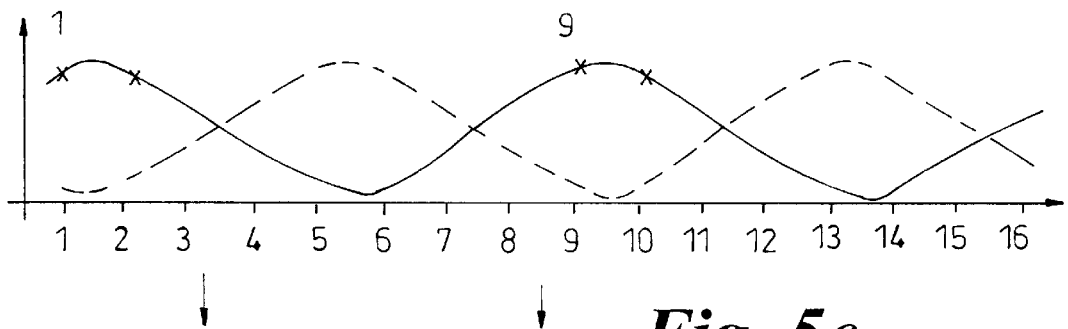

The frequency response of filter element 21c is shown in FIG. 5c and has a period double that of filter 21b, and hence quadruple that of filter 21a. Filter element 21c however has its frequency response shifted compared with the prior art such that minimum attenuation is not at channel 1, but is between channel 1 and 2. While channels 1 and 9 are attenuated slightly compared to filter element 11c of the prior art arrangement this is not significant and these channels are still passed to output port Y. Similarly, while channel 5 is not fully attenuated compared to filter element 11c of the prior art, it is still sufficiently attenuated such that it is not passed to output port Y, and instead is passed to output port Z.

While channel 2 and 10 were filtered out before the input to filter 21c, it can be seen that filter element 21c would pass these channels to its output port Y if they were present at its input port X. It can therefore be seen that the filter design IV corresponding to filter element 21c can also be used at filter element 21h which is required to pass channel 2 and 10. In this way, a smaller number of filter designs can be reused within the demultiplexer structure, thus reducing demultiplexer costs.

Figure 5D:
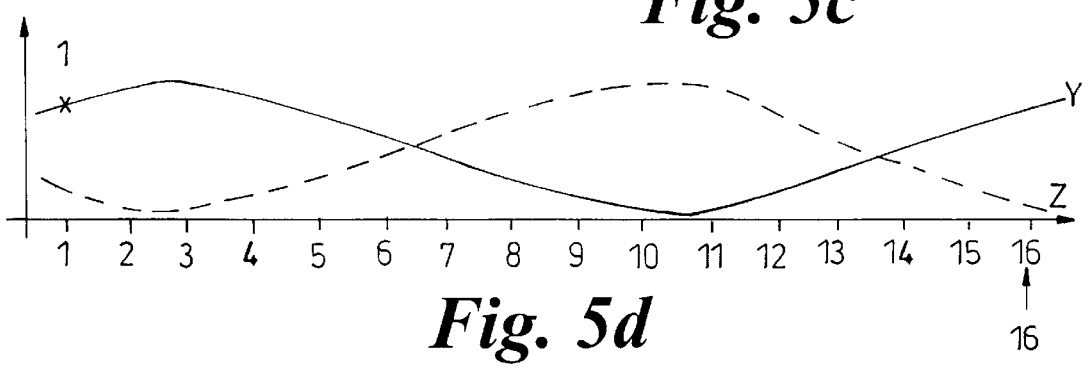

The output port Y of filter element 21c is coupled to the input port X of filter element 21d. The frequency response of filter 21d is shown in FIG. 5d. As can be seen, the frequency response has been shifted or re-optimised compared with the prior art filter 11d shown in FIG. 3d, such that this filter design VI may be reused within the demultiplexer 20 of FIG. 4. Filter element 21d is implemented to pass channel 1 and block channel 9 from output port Y, and to block channel 1 and pass channel 9 to output port Z. While the passing and attenuation of channels 1 and 9 is not optimised compared with the prior art filter design 11d, this enables filter design 21d to be reused at for example filter element 21i which is implemented to pass channel 3 to output port Y and channel 11 to output port Z. Similarly the filter design 21d is implemented at filter element 21k which is implemented to pass channel 2 at its output port Y and channel 10 at its output port Z; and again at filter element 21n which is implemented to pass channel 4 to its Y output port and channel 12 to its Z output port.

As can be seen from FIGS. 4 and 5, the invention can be applied to a demultiplexer or multiplexer 20 having more than 2 filter stages, such that only two filter designs are used per filter stage. As can be seen, in stage 3 of the demultiplexer structure 20 of FIG. 4, only two filter designs IV (corresponding to filter element 21c and the frequency response of FIG. 5c) and V are required. Similarly in the fourth stage, only filter designs VI (corresponding to filter element 21d and frequency response of figure 5d) and VII are required.

A preferred design algorithm is shown below:

| Stage | Period | Peak Wavelengh (s) |
|---|---|---|
| 1 | T | $\lambda 1$ |
| 2 | 2T | $\lambda 1$ & $\lambda 2$ |
| 3 | 4T | $(\lambda 1 + \lambda 2)/2$ & $(\lambda 3 + \lambda 4)/2$ |
| 4 | 8T | $(\lambda 1 + \lambda 2 + \lambda 3 + \lambda 4)/4$ & $(\lambda 5 + \lambda 6 + \lambda 7 + \lambda 8)/4$ |
| n | $2^{(n-1)}T$ | $(\lambda 1 + \lambda 2 + \ldots + \lambda_n)/n$ & $(\lambda_{n+1} + \lambda_{n+2} + \ldots \lambda_{2n})/n$ |

The table below shows an example 16 channel demultiplexer with 25 nm channel spacing, requiring only 7 filter designs I–VII.

| Filter | $\lambda$max | Design Period |
|---|---|---|
| I | 1525 nm | 50 nm |
| II | 1525 nm | 100 nm |
| III | 1550 nm | 100 nm |
| IV | 1537.5 nm | 200 nm |
| V | 1587.5 nm | 200 nm |
| VI | 1562.5 nm | 400 nm |
| VII | 1662.5 nm | 400 nm |

Figure 6:
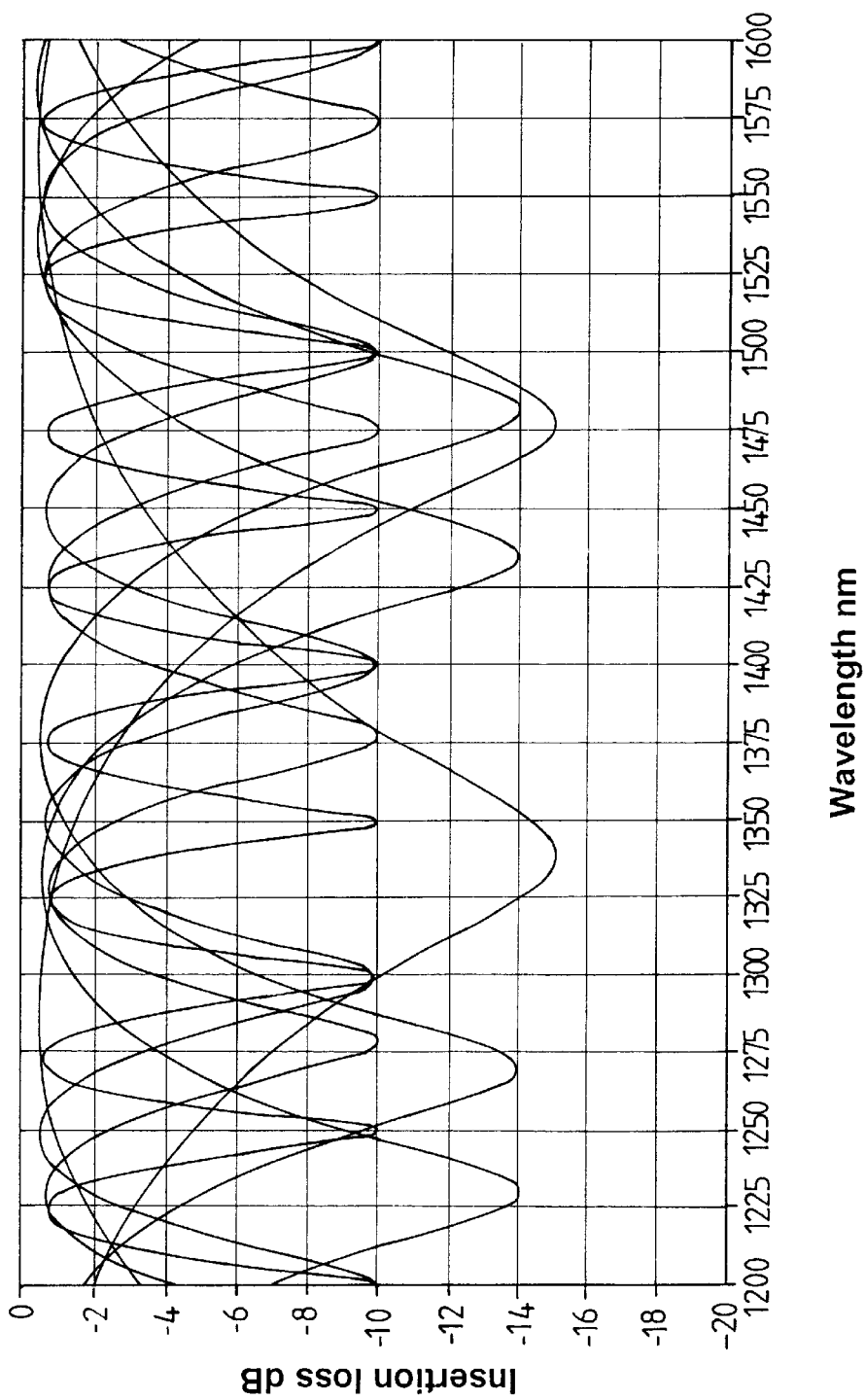
FIG. 6 shows the frequency responses of 7 filters for the demultiplexer of FIG. 4.

Attenuation versus frequency plots of the seven sinusoidal filters I–VII shown in the above table are shown in FIG. 6. The filter designs I–VII were modelled to a specification supplied by Sifam.

While the invention has been described with respect to fused fibre couplers, any device filter type having a sinusoidal complimentary frequency response could alternatively be used. Examples include Mach-Zender, Fabry Perot, and Dielectric filters.

As a further alternative, any device or filter type having a periodic complimentary frequency response can be used, although sinusoidal or near-sinusoidal is preferred.

As a still further alternative, a mixture of device or filter types can be used. In one embodiment a Mach-Zender filter is used for filter element 21a, and fused coupler filter elements are used for the remaining filter elements 21b–o.

Figure 7:
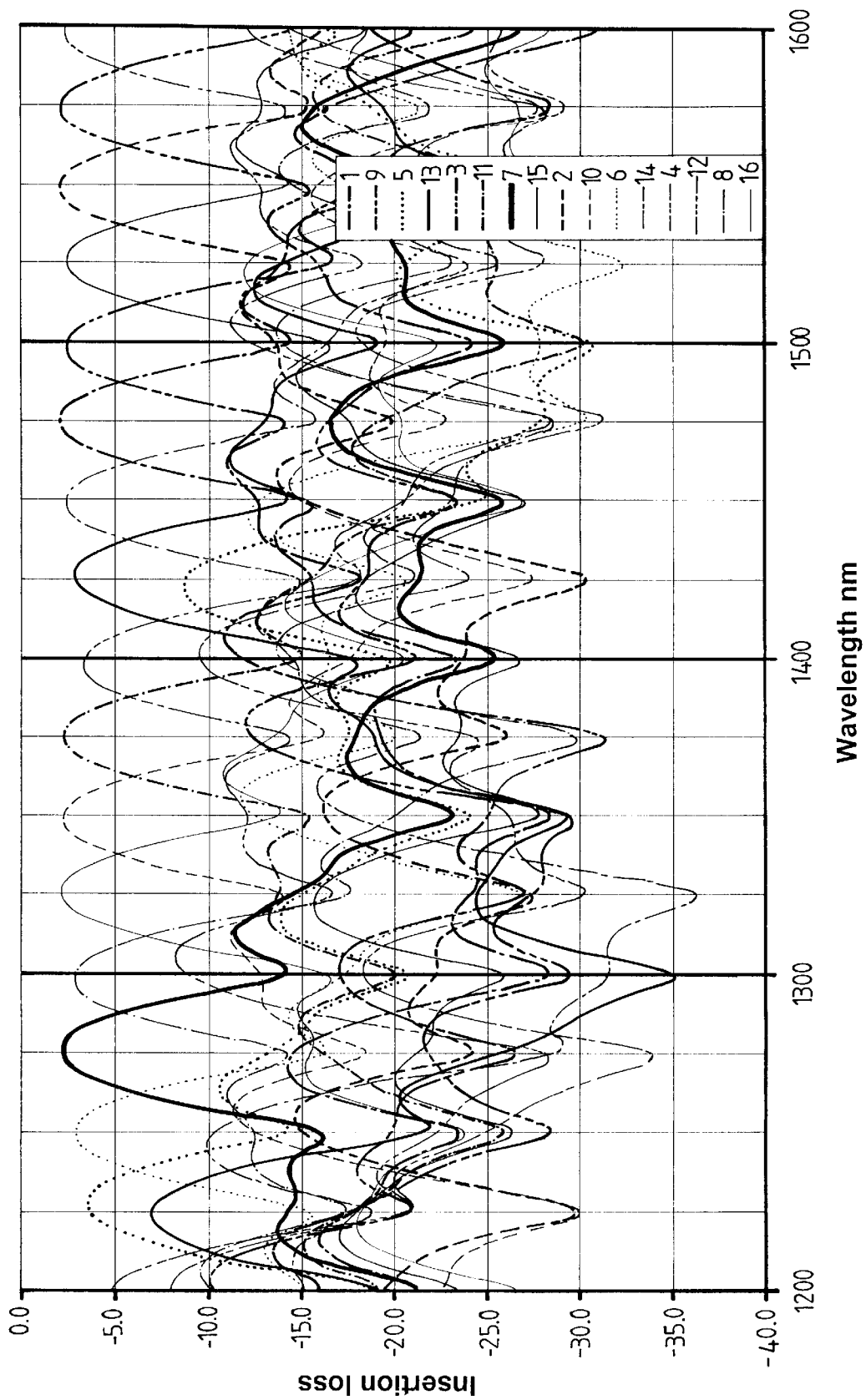
FIG. 7 shows the frequency response of a demultiplexer implemented with the filters shown in FIG. 6.

In the preferred embodiment demultiplexers (and multiplexers) are implemented using fused coupler filter elements. The frequency response of a demultiplexer as shown in FIG. 4 and implementing fused coupler filter elements according to FIG. 6 is shown in FIG. 7.

While there is increased attenuation of the channel signals using the reoptimised filters, this is not significant and still allows for effective demultiplexing of WDM signals.

While the invention has been described with respect to filter elements and in particular four port fused fibre couplers, any device having at least one input port and two output ports wherein the output ports are complimentary in wavelength could also be used.

The invention can be implemented as a multiplexer or demultiplexer having a number of different architecture types including compact and distributed or stretched. The invention may also be implemented as an add/drop multiplexer (or demultiplexer) where not all of the channels are (de)multiplexed.

When implemented as a multiplexer the inventive architecture preferably also comprises a filter added to each channel input in order to reduce crosstalk from other channels. Preferably a Fabry-Perot filter is used.

Figure 8:
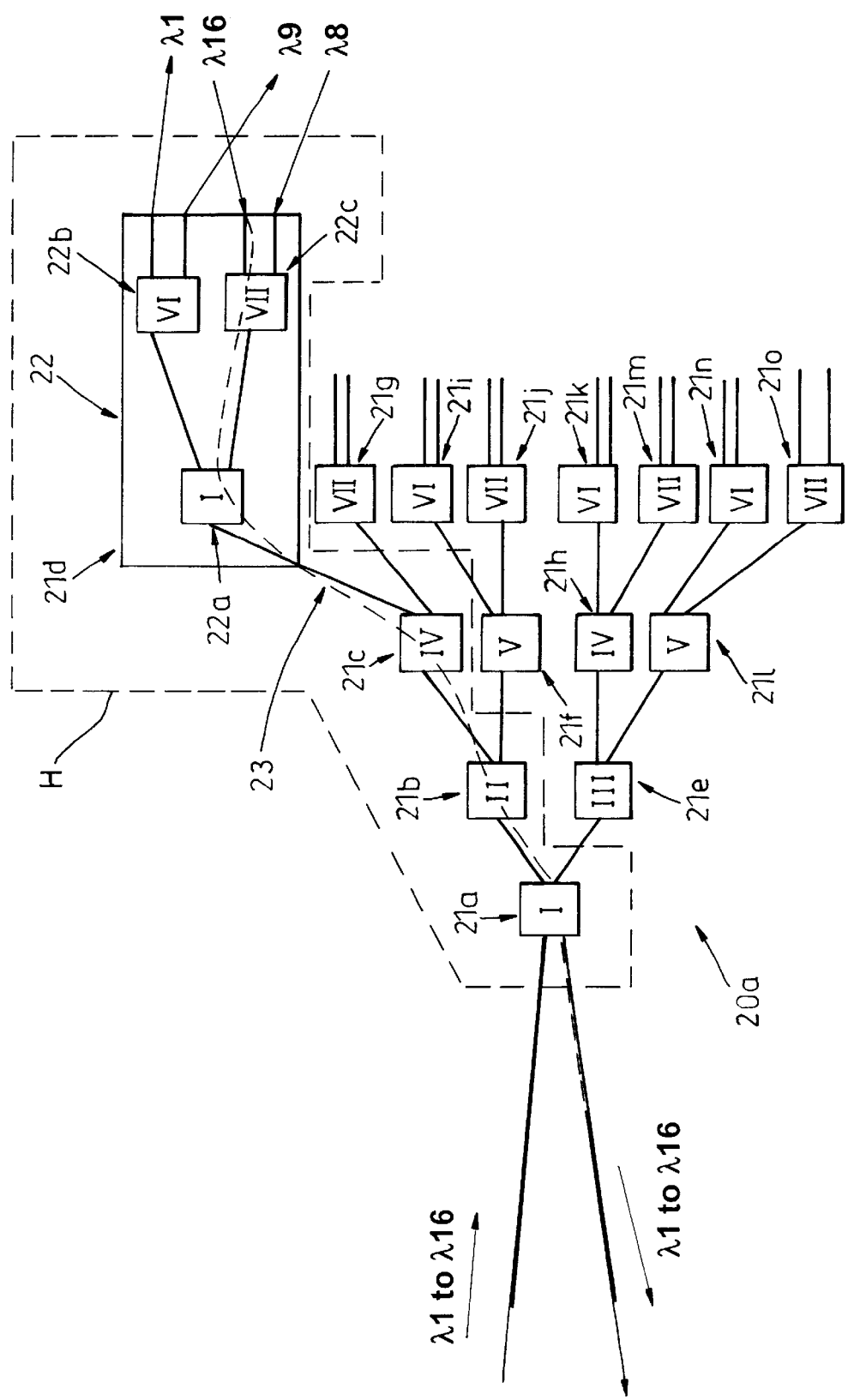
FIG. 8 shows a second preferred demultiplexer architecture according to the present invention.

FIG. 8 shows a second preferred embodiment of the present invention which implements a bi-directional multiplexer/demultiplexer 20a. The same basic architecture of the first preferred embodiment according to FIG. 4 is utilised, but each final filter element is replaced by a bi-directional module 22. For ease of explanation, the filter design types (I–VII) have been placed within the boxes representing each filter element 21. The first three stages of filter elements are the same as in the first preferred embodiment of FIG. 4, for example filter elements 21a, 21b and 21c. However, each of the final stage filter elements 21d, 21g, 21i, 21j, 21k, 21m, 21n, and 21o, are replaced by a bi-directional module 22. It should be noted that it is always the final stage filter elements which are replaced by this bi-directional module 22, so that in a five stage demultiplexer for example, the filter elements 21a–21o in the first four stages will be the same as in the first preferred embodiment of FIG. 4.

The bi-directional module 22 replaces each final stage filter element of the first preferred embodiment, and includes the same two filter designs VI and VII of the final stage elements. The bi-directional module 22 comprises three filter elements 22a, 22b and 22c arranged in a tree and branch structure as shown. Filter element 22a has the same filter design I as the first stage filter element 21a. Filter elements 22b and 22c are of filter designs VI and VII respectively, the same designs as employed in the final stage of the preferred embodiment filter elements which they replace. This arrangement allows the demultiplexer structure 20a to also be used as a multiplexer structure, channels 1–16 corresponding to wavelength λ1–16 being fed into the Y and Z ports of filter elements 22c of the bi-directional modules 22 forming the final stage of the demultiplexer/multiplexer 20a.

Figure 9A:
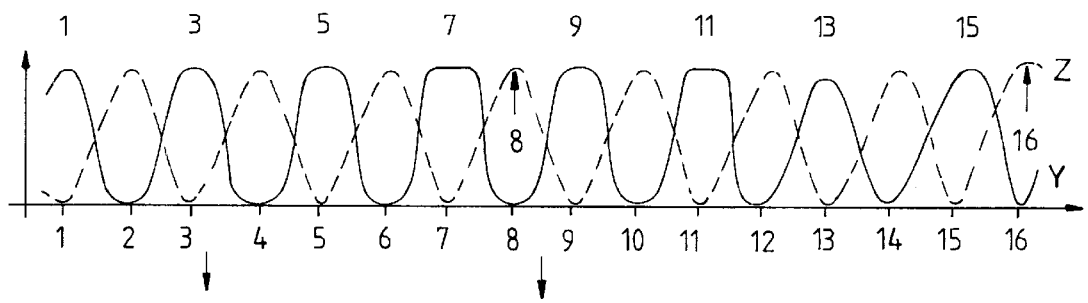
FIGS. 9a–f show the frequency responses of a channel series (H) within the structure of FIG. 8.
Figure 9B:
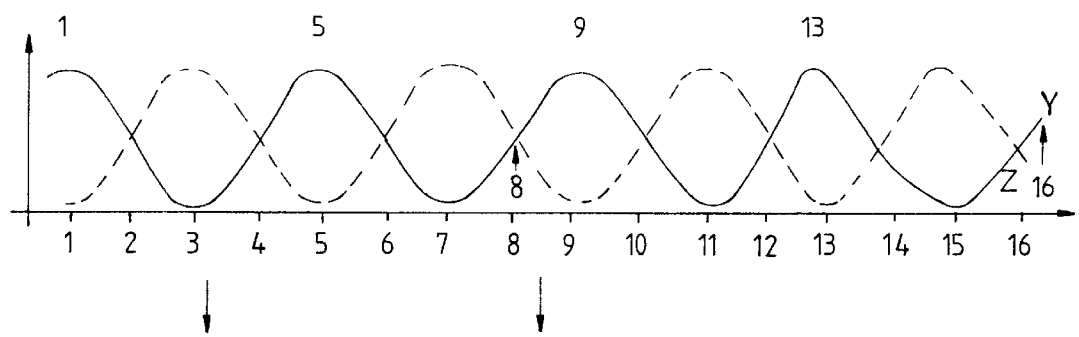
Figure 9C:
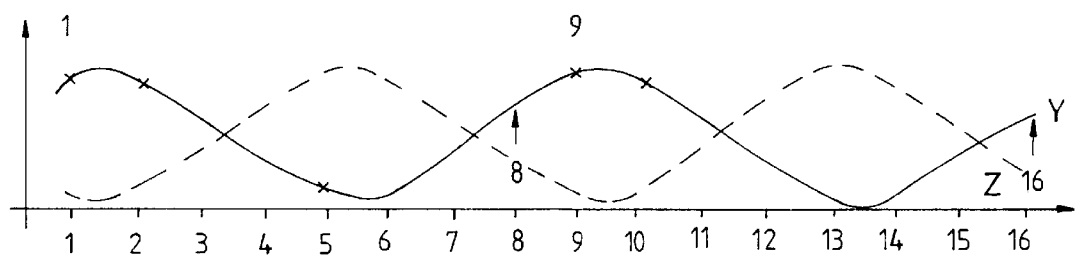
Figure 9D:
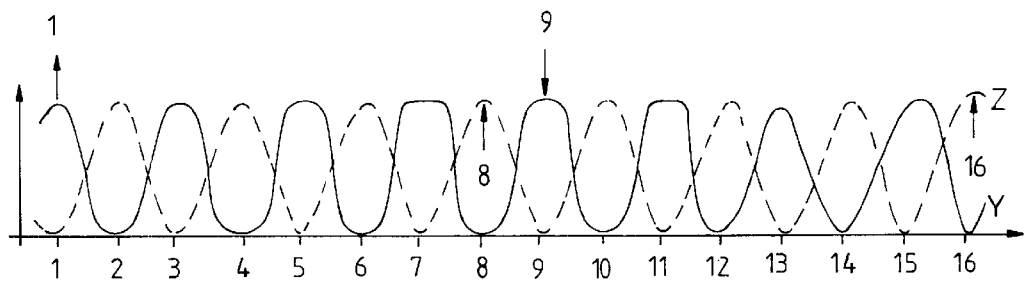
Figure 9E:
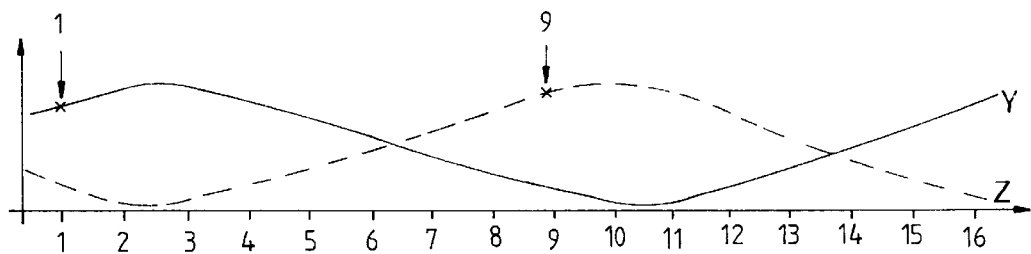

The frequency responses of the filter element series H comprising filter elements 21a, 21b, 21c, 22a, 22b and 22c are shown in FIGS. 9a–9f. These figures correspond largely with the frequency responses shown in FIGS. 5a–5d which correspond to the demultiplexer shown in FIG. 4. As the first three stages of the second preferred embodiment demultiplexer/multiplexer 20a structure is the same as that of the structure in FIG. 4, FIGS. 9a–c are the same as FIGS. 5a–c. Output port Y of filter element 21c is connected to the input port X of filter element 22a which has the same filter design I as filter element 21a. Referring to FIG. 4, it can be seen that the output wavelengths from the Y output port of filter element 21c are λ1 and λ9 which will pass to the Y output port of filter element 22a which is in turn coupled to the input port X of filter element 22b. Filter element 22b has the same filter design VI as the corresponding stage 4 filter element 21d in FIG. 4. The frequency response of filter element 22b is shown in FIG. 9e, and it can be seen that channel 1 corresponding to wavelength λ1 will pass to the Y output port of this filter element, while channel 9 will pass to the Z output port.

Figure 9F:
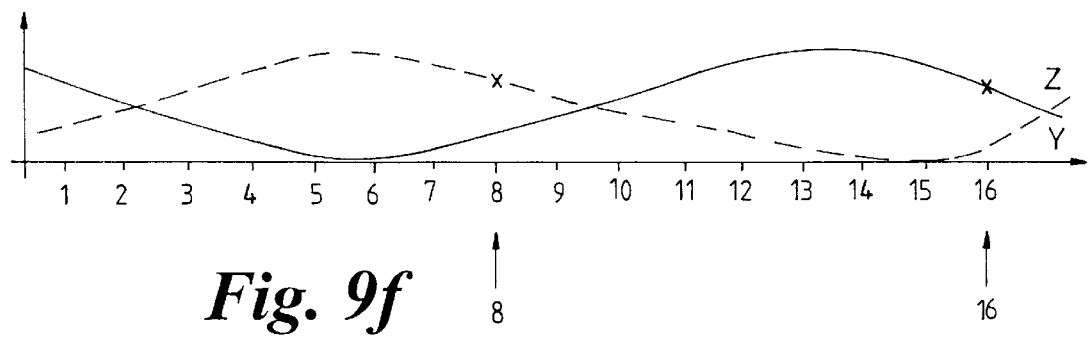

As a part of the multiplexer 20a, channels 16 and 8 are fed into respectively the Y and Z ports of filter element 22c which has the same filter design VII as filter element 21g in the demultiplexer structure of FIG. 4. The frequency response of this element 22c is shown in FIG. 9f, and it can be seen by looking up the page that channel 16 will pass through the Y port to the X port of filter element 22c, and that channel 8 will pass through the Z port of this filter element 22c to its X port. The X port of filter element 22c is coupled to the Z port of filter element 22a, and it can be seen in FIG. 9d that channels 8 and 16 are passed to the X port of filter element 22a. The X port of filter element 22a is coupled to the Y port of filter element 21c, and it can be seen from FIG. 9c that channels 8 and 16 on the Y port of filter element 21c will pass to the X port of this element. This in turn is coupled to the Y port of filter element 21b, channels 8 and 16 being passed to the X port of this element. The X port of filter element 21b is coupled to the Y port of filter element 21a. It can be seen from FIG. 9a, that channels 8 and 16 do not pass to the X port of this element 21a, but instead to its complimentary or other 'input' port W.

As already described, the bi-directional module 22 replaces each of the final stage filter elements 21g, 21i, 21j, 21k, 21m, 21n and 21o. The design of each bi-directional module 22 is the same, each having a three filter elements of design I, VI and VII. By building up this structure 20a it can be seen that the structure is symmetrical. In the example shown, module 22 input channels 8 and 16 correspond to the output channels of filter element 21o. Similarly the input channels 1 and 9 for filter element 21o correspond to the output channels of module 22. It can be seen that in the final demultiplexer/multiplexer structure 20a channels 1–16 incident on the X port of filter element 21a are demultiplexed through the structure 20a, individual channels appearing at the Y and Z outports of filter element 22b in each of the bi-directional modules 22. In addition, individual channels 1–16 input into the Y and Z ports of filter elements 22c in the bi-directional modules 22 are multiplexed into a combined signal appearing at the W port of filter elements 21a. Thus the structure shown in FIG. 8 can be used simultaneously as both a demultiplexer and a multiplexer, that is it is bi-directional.

Preferably the demultiplexer/multiplexer structure 20a is implemented in a distributed or stretched architecture where the fibre lengths between each filter element 21 can be of some distance. Fibre lengths of this type are a significant cost in any distributed or 'stretched' multiplexer or demultiplexer architecture. By having a combined demultiplexer/multiplexer 20a, these costs are effectively halved.

The invention particularly relates to optical fibre devices, but could also be implemented as an optical waveguide device. For example wherein one or more optical waveguide cores are fabricated on a planar substrate that is common to the waveguides of the device.

For the purposes of this specification, the terms "optical" and "light" should be understood as pertaining not only to the visible part of the electromagnetic spectrum, but also to the infra-red and ultra-violet parts that bound the visible part.

The invention has been described with reference to preferred embodiments. Modifications and alterations as would be obvious to those skilled in the art are intended to be incorporated within the scope hereof.

What is claimed is:

1. An apparatus or structure arranged to filter a predetermined range and number of wavelengths comprising:
   a tree and branch filter architecture having a plurality of filters, each having a frequency response such that said filter passes a first set of wavelengths to a first output port and a second set of wavelengths to a second output port;

wherein at least two filters have the same frequency responses, and wherein each of said same frequency response filters are arranged to pass different wavelength sets.

2. An apparatus as claimed in claim 1 wherein said filters are sinusoidal filters.

3. An apparatus as claimed in claim 1 wherein said filters are fused fibre couplers.

4. An apparatus as claimed in claim 1 wherein the apparatus comprises a number (n) of filter stages and wherein each stage has filters with a maximum of two different frequency responses.

5. An apparatus as claimed in claim 4 wherein the minimum attenuated wavelengths of the two frequency responses are:

$(T_1+T_2+ \ldots +T_n)/n$ and $(T_{n+1}+T_{n+2}+ \ldots +T_{2n})/n$, each having a period of $2^{(n-1)}T$.

6. A demultiplexer comprising:

a plurality of devices each having at least one input port and two output ports, the frequency responses of the output ports of each device being periodic and complimentary in wavelength;

wherein the devices are connected in a tree and branch architecture to demultiplex a predetermined range and number of wavelengths;

and wherein at least two of the devices have the same frequency responses.

7. A demultiplexer as claimed in claim 6 wherein the devices are fused fibre couplers.

8. A demultiplexer as claimed in claim 7 wherein the demultiplexer comprises a number of stages and wherein each stage has devices with a maximum of two different frequency responses.

9. An apparatus arranged to multiplex or demultiplex a predetermined range and number of wavelengths comprising:

a plurality of devices each having at least one input port and two output ports, the output ports of each device having a periodic and complimentary series of minimum attenuation wavelength peaks;

wherein the devices are arranged such that each multiplexes or demultiplexes a unique series of wavelengths;

and wherein the apparatus comprises at least one device having a series of minimum attenuation wavelength peaks which do not correspond to the unique series of wavelengths the device is arranged to multiplex or demultiplex.

10. An apparatus as claimed in claim 9 wherein the devices are fused fibre couplers.

11. An apparatus as claimed in claim 9 wherein the apparatus comprises a number of stages and wherein each stage has devices with a maximum of two different frequency responses.

12. An apparatus as claimed in claim 11 wherein each device in the last stage is replaced with a bi-directional module to enable said apparatus to simultaneously multiplexes and demultiplexes said wavelengths.

13. An apparatus as claimed in claim 12 wherein each said module comprises a four port device having the same frequency response as the device in the first stage, and two devices having the same two responses as the replaced devices.

14. An optical network or network segment comprising an apparatus or structure arranged to filter a predetermined range and number of wavelengths comprising:

a tree and branch filter architecture having a plurality of filters, each having a frequency response such that said filter passes a first set of wavelengths to a first output port and a second set of wavelengths to a second output port;

wherein at least two filters have the same frequency responses, and wherein each of said same frequency response filters are arranged to pass different wavelength sets.

15. An apparatus arranged to simultaneously multiplex and demultiplex a predetermined range and number of wavelengths comprising:

a plurality of devices each having at least one input port and two output ports, the output ports of each device having a periodic and complimentary series of minimum attenuation wavelength peaks;

wherein the devices are arranged such that each multiplexes and demultiplexes a unique series of wavelengths;

and wherein the apparatus comprises at least one device having a series of minimum attenuation wavelength peaks which do not correspond to the unique series of wavelengths the device is arranged to demultiplex.

16. An apparatus as claimed in claim 15 wherein the devices are arranged into a tree and branch architecture having a first device comprising two input ports, said ports having a periodic and complimentary series of minimum attenuation wavelength peaks being symmetrical with said output port peaks; the apparatus arranged such that a signal to be demultiplexed is fed to one said input port and a multiplexed signal is fed from the other said input port.

17. An apparatus as claimed in claim 15 wherein the devices are fused fibre couplers.

18. An apparatus as claimed in claim 15 wherein the demultiplexer comprises a number of stages and wherein each stage has devices with a maximum of two different frequency responses.

* * * * *